US 12,402,985 B1

(12) United States Patent
Niznick

(10) Patent No.: US 12,402,985 B1
(45) Date of Patent: Sep. 2, 2025

(54) SELF-TAPPING EXTERNALLY THREADED DENTAL IMPLANTS INCLUDING MULTIPLE EXTERNAL CUTTING GROOVES

(71) Applicant: Gerald A Niznick, Las Vegas, NV (US)

(72) Inventor: Gerald A Niznick, Las Vegas, NV (US)

( * ) Notice: Subject to any disclaimer, the term of this patent is extended or adjusted under 35 U.S.C. 154(b) by 0 days.

(21) Appl. No.: 18/937,673

(22) Filed: Nov. 5, 2024

(51) Int. Cl.
*A61C 8/00* (2006.01)

(52) U.S. Cl.
CPC .......... *A61C 8/0025* (2013.01); *A61C 8/0021* (2013.01); *A61C 8/0037* (2013.01)

(58) Field of Classification Search
CPC ... A61C 8/0022; A61C 8/0024; A61C 8/0025; A61C 8/0021; A61C 8/0037
See application file for complete search history.

(56) References Cited

U.S. PATENT DOCUMENTS

| 9,855,117 B2 * | 1/2018 | Hwang | A61C 8/0024 |
| 10,709,524 B2 * | 7/2020 | Fromovich | A61C 8/0068 |
| 2015/0086942 A1 * | 3/2015 | Hwang | A61C 8/0069 433/174 |
| 2017/0071702 A1 * | 3/2017 | Fromovich | A61C 8/0022 |

FOREIGN PATENT DOCUMENTS

EP 2496169 B1 * 5/2021 ........... A61C 8/0022

* cited by examiner

*Primary Examiner* — Ralph A Lewis
(74) *Attorney, Agent, or Firm* — Patrick Bright

(57) ABSTRACT

An externally threaded screw-type self-tapping dental implant includes: two or more external cutting grooves, at least one/one set that cuts in clockwise rotation of the implant, and at least one/another set, that cuts in counter-clockwise rotation of the implant; and an internal passage in the implant that includes internal wrench-engaging surfaces and internal threads.

9 Claims, 2 Drawing Sheets

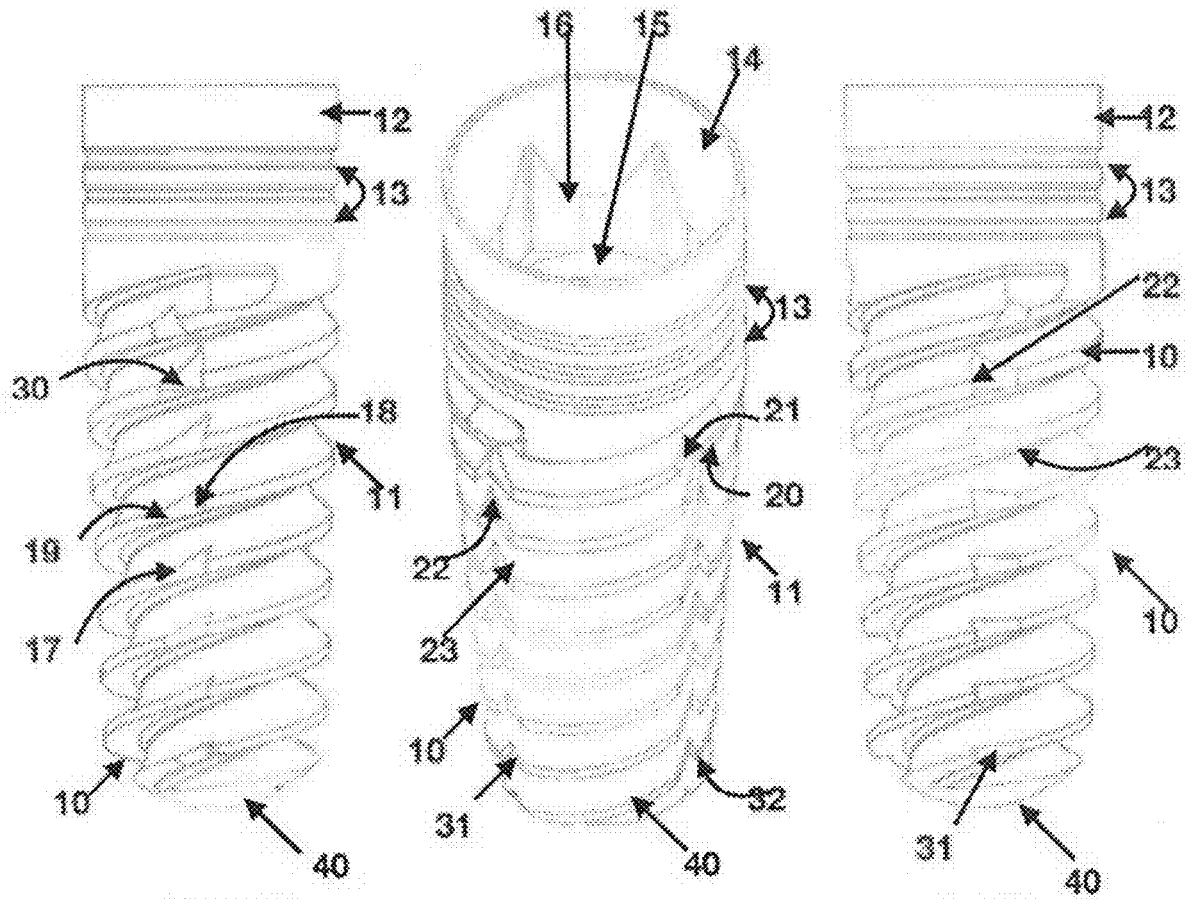
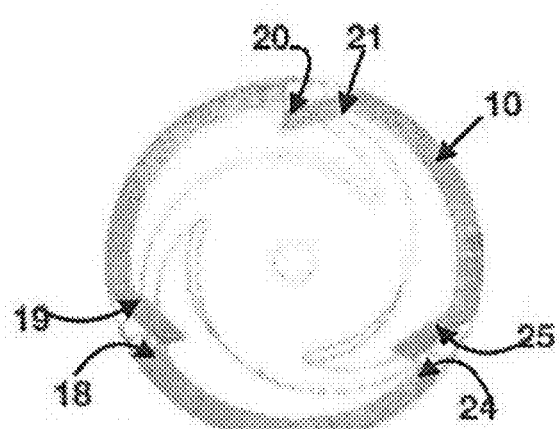

SELF-TAPPING EXTERNALLY THREADED DENTAL IMPLANTS INCLUDING MULTIPLE EXTERNAL CUTTING GROOVES

SUMMARY OF INVENTION

Self tapping, externally threaded, screw-type dental implants include an externally threaded body portion with a plurality of cutting grooves. At least one groove/a first set of grooves cuts bone during clockwise rotation/seating of the implant into a placement site. At least a second groove/a second set of grooves cuts bone during counterclockwise rotation of the same implant while backing out the implant from a placement site. These implants also include an internal passage, located inside the body of the implant. This passage includes internal wrench-engaging surfaces and internal threads, located inside the body of these implants.

The externally threaded body portion of these implants includes one or more vertical or spiral cutting grooves, formed in the external threads, and, in some embodiments, positioned along the longitudinal axis of the implant, with the cutting edge of each groove facing clockwise to form threads in an implant placement-site during clockwise rotation of the implant into that site, and one or more vertical or spiral grooves, positioned along the longitudinal axis of the implant, with the cutting edge of these separate/additional grooves facing counterclockwise to enlarge the placement site and assist in unscrewing the implant from that site.

Depending on the density of the bone at the placement site, the diameter of the implant, and the size of the socket formed at the placement site, an implant may encounter placement resistance that prevents full seating of the implant in the site. Applying torque greater in magnitude than force in the range of 50-60 Nem to overcome such resistance could damage the bone at the site, or the implant's internal wrench-engaging surfaces. Encountering this degree of resistance may lead to removal of the implant from the site and enlargement of the placement socket before re-inserting the implant for clockwise rotation to full seating placement.

With the bi-directional cutting grooves of this invention, a partially seated implant can be rotated, alternately, counterclockwise and then clockwise in a desired placement site, enlarging the site to provide full seating of the implant at the site, without implant removal from the site and enlargement, as by re-drilling, of the site.

The leading surface of these grooves includes a flat relief side that forms a surface that extends toward the clockwise or counterclockwise rotation of the implant during implant placement and removal. In some embodiments, the cutting edges of each of these grooves, formed on the outer edge of the threads opposing the flat relief side of the groove, is positioned at a 90 degree angle, or at an acute angle, tangential to the circumference defined by the outermost edges of the threads. In some embodiments, this flat relief surface, and the surface defining the cutting edge of each groove, will be dictated, in part, by the diameter of the implant, with both the cutting edge angle, and the inner angle positioned between the flat relief surface and the flat surface defining the cutting edge of each groove, being in the range between 45 degrees and 90 degrees.

Preferably, there are two sets of grooves that cut bone during clockwise rotation of the implant into a placement site, and one set of grooves that cuts bone during counterclockwise rotation of the implant into a placement site. The cutting groves may extend from the distal end of the implant up to, or near the top thread on the body portion of the implant, or to the widest diameter near the top of the implant.

The grooves in each set are formed in external threads on the body of an implant, and are, in some embodiments, positioned below one another in a vertical array that is parallel to the implant's vertical axis, or are positioned/formed in a spiral array, preferably spaced at regular/equal intervals along the external threading of the implant.

Preferably, where there are only two vertical sets of grooves, they are spaced apart about 180 degrees from one another on opposite sides of the implant's external surface. Where there are three sets of vertical grooves, they may be spaced from one another at 120 degrees around the external surface of the implant.

Preferably, where at least some cutting grooves are arrayed spirally along an implant's external threads, adjacent grooves are spaced from one another at about 180 degrees around the circumference of the implant.

The implant may include a beveled opening at the proximal end of the internal passage. This lead-in bevel may have a degree of taper in the range of about 40 to about 83 degrees.

The implants may have a length in the range of about 6 mm to about 18 mm; a diameter in the range of about 3 mm to 7 mm; and a smooth or roughened coronal neck portion having a length in the range of about 1 mm to 3 mm. The implant may be straight/untapered, or may taper, from 1-2 mm, from the coronal end to the apical end, or may taper in just the distal portion of the implant, from 1-2 mm. The implant's body portion may be roughened by blasting, or acid etching, and may be coated with hydroxyapatite. The necks of the implants may have gauge lines positioned at 0.5-1 mm increments from the top of the implant.

BRIEF DESCRIPTION OF THE DRAWINGS

The appended drawings illustrate, but do not define or limit the scope of, this invention. In the drawings:

FIG. 1 shows a vertical elevation view of an externally threaded endosseous dental implant with a first set of cutting grooves formed in, and vertically arrayed on the implant's external threads;

FIG. 2 shows a perspective view of the externally threaded endosseous dental implant of FIG. 1 with second and third sets of cutting grooves formed in, and vertically arrayed on the implant's external threads;

FIG. 3 shows a second vertical elevation of the externally threaded endosseous dental implant of FIG. 1 with the third set of cutting grooves formed in, and vertically arrayed on the implant's external threads;

FIG. 4 shows a top plan view, in cross-section, of the externally threaded endosseous dental implant shown in FIGS. 1 to 3;

DETAILED DESCRIPTION OF THE DRAWINGS

Figures 5, 6, 7:
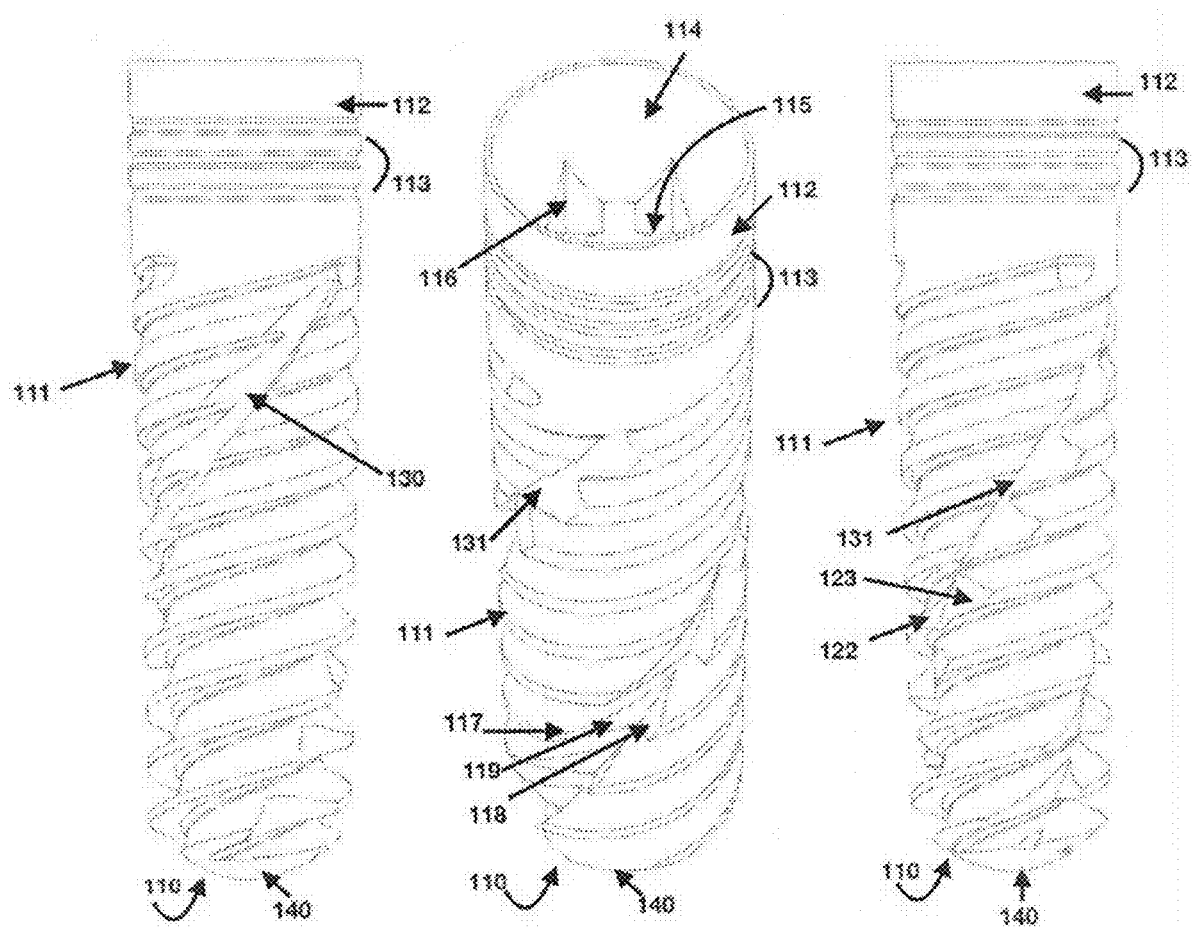
FIG. 5 shows a vertical elevation view of an externally threaded endosseous dental implant with a first set of cutting grooves for cutting during clockwise rotation of the implant, with the grooves formed in, and spirally arrayed on the implant's external threads.
FIG. 6 shows a perspective view of the externally threaded endosseous dental implant of FIG. 5.
FIG. 7 shows a vertical elevation view of an externally threaded endosseous dental implant with a first set of cutting grooves for cutting during counter clockwise rotation of the implant, with the grooves formed in, and spirally arrayed on the implant's external threads.

In the drawings, FIGS. 1 to 4 show tapered, endosseous dental implant 10 with external threads that extend downwardly from implant neck portion 12 to distal implant end 40. Neck portion 12 includes three circumferential rings 13 that function as depth gauge lines to guide insertion of dental implant 10 into a patient's jawbone.

FIG. 1 shows a first set of grooves 30 formed in a vertical array parallel to the longitudinal axis of implant 10. This first set of grooves cuts bone in an implant insertion site as implant 10 is rotated clockwise into a site in a patient's jawbone. Each groove 17 includes flat leading surface 19, and opposing surface 18, shorter in length than surface 19, that includes a cutting edge formed at an acute angle with respect to the tangent formed by the outer edges of the threading.

FIG. 2 shows second and third sets of grooves 31 and 32 formed in vertical arrays parallel to the longitudinal axis of implant 10. Groove set 32 cuts bone in an implant insertion site as implant 10 is rotated clockwise into a site in a patient's jawbone.

Each groove in set 31 includes flat leading surface 23, and opposing surface 22, shorter in length than surface 23, that includes a cutting edge formed at an acute angle with respect to the tangent formed by the outer edges of the threading. Each groove in set 32 includes flat leading surface 21, and opposing surface 20, shorter in length than surface 21, that includes a cutting edge formed at an acute angle with respect to the tangent formed by the outer edges of the threading.

FIG. 2 also shows internal passage or shaft 15, formed inside implant 10. Shaft/passage 15 includes internal, lead in bevel 14, and internal wrench-engaging surfaces 16.

FIG. 3 shows implant 10 in vertical elevation with third set of grooves 31 visible in the threads on the external surface of implant 10. All grooves on implant 10 have both opposing surfaces that extend from the external surface of implant to the outer edges of the external threads on implant 10.

FIG. 4 shows dental implant 10 with the cutting grooves spaced 120 degrees apart from one another.

FIGS. 5 to 6 show tapered, endosseous dental implant 110 with external threads 111 that extend downwardly from implant neck portion 112 to distal implant end 140. Neck portion 112 includes three circumferential rings 113 that function as depth gauge lines to guide insertion of dental implant 110 into a patient's jawbone.

FIGS. 5 and 6 show a first set of grooves 130 formed in a spiral array on external threads 111. This first set of grooves cuts bone in an implant insertion site as implant 110 is rotated clockwise into a site in a patient's jawbone. Each groove 117 includes flat leading surface 119, an opposing surface 118, shorter in length than surface 119, that includes a cutting edge formed at an acute angle with respect to the tangent formed by the outer edges of threads 111.

FIGS. 6 and 7 show a second set of grooves 131 formed in a spiral array on external threads 111. Groove set 131 cuts bone in an implant insertion site as implant 110 is rotated counter clockwise into/from a site in a patient's jawbone.

Each groove in set 131 includes flat leading surface 123, and opposing surface 122, shorter in length than surface 123, that includes a cutting edge formed at an acute angle with respect to the tangent formed by the outer edges of the threading.

FIG. 6 also shows internal passage or shaft 115 formed inside implant 110. This passage includes internal, lead in bevel 114, and internal wrench-engaging surfaces 116.

Figure 8:
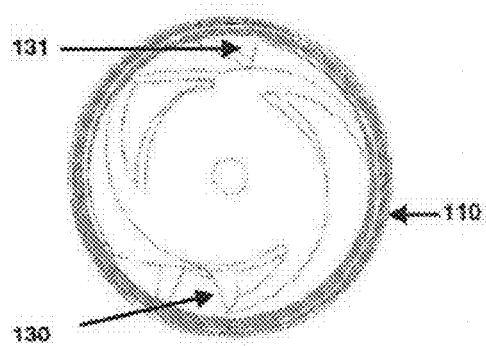
FIG. 8 shows a plan view of the externally threaded endosseous dental implant shown in FIGS. 5 to 7.

FIG. 8 shows an apical plan view of implant 110 showing the clockwise cutting groove 130 and the counter-clockwise cutting groove 131.

Where a range of values is provided, every intervening value, between the upper and lower limit of that range and any other stated or intervening value in that stated range is included within the invention. The upper and lower limits of these smaller ranges may be included in the smaller ranges, and are likewise included within the invention. Where the stated range includes one or both of the limits, ranges excluding either or both of those included limits are also included in the invention In this specification and in the appended claims, the singular forms "a", "and", "said", and "the" include plural referents unless the context clearly dictates otherwise. The claims may be so-drafted to require singular elements or exclude any optional element. These statements provide antecedent basis for use of such exclusive terminology as "solely", "only", and the like in connection with the recitation of claim elements, and/or the use of "negative" claim limitation(s).

While this invention has been described in conjunction with the exemplary embodiments outlined above, the foregoing description of exemplary embodiments of the invention, as set forth above, is illustrative, not limiting. The invention is not necessarily so constrained. Many alternatives, adaptations modifications, and/or variations may be apparent to those skilled in the art.

The invention claimed is:

1. A self-tapping, externally threaded, screw-type endosseous dental implant includes an elongated body having a tapered body portion and an internally-threaded passage inside the body of said implant and internal wrench-engaging surfaces located inside said passage, wherein the external threads include a plurality of cutting grooves, and wherein at least one groove/first set of grooves cuts bone during clockwise rotation of said implant into a placement site, and at least one groove/a second set of grooves cuts bone during counter-clockwise rotation of said implant into said placement site, and wherein each of said cutting grooves includes a flat leading surface and an opposing cutting edge on a second surface on each of said grooves, wherein each cutting edge is formed at an acute angle with respect to the circumference defined by the outer edges of said grooves, and wherein all of the grooves in a set of said grooves are positioned below one another in a vertical array that is parallel to said implant's longitudinal/vertical axis, and wherein said vertical array extends along the entirety of said tapered body portion up to the widest diameter of said body near the top of said dental implant.

2. The implant of claim 1 further comprising two sets of said cutting grooves that cut bone during clockwise rotation of said implant into said placement site.

3. The implant of claim 1 wherein said first and second sets are spaced apart from one another on said implant's external surface by a distance of at least a quarter of said implant's external diameter.

4. A self-tapping, externally threaded, screw-type endosseous dental implant includes an elongated body having a tapered body portion with an internally-threaded passage inside the body of said implant and having internal wrench-engaging surfaces located inside said passage, wherein the external threads include a plurality of cutting grooves, and wherein at least one groove/first set of grooves cuts bone during clockwise rotation of said implant into a placement site, and at least one groove/a second set of grooves cuts bone during counter-clockwise rotation of said implant into said placement site, and wherein each of said cutting grooves includes a flat leading surface and an opposing cutting edge on a second surface on each of said grooves, wherein all of the grooves in a set of said grooves are positioned in an array that extends along the entirety of said tapered body portion up to the widest diameter near the top of said body.

5. The implant of claim 4 wherein at least some of the cutting grooves are arrayed spirally along said tapered body portion.

6. The dental implant of claim 4 wherein each cutting edge is formed at an acute angle with respect to the circumference defined by the outer edges of said grooves.

7. The implant of claim 4 further comprising two sets of said cutting grooves that cut bone during clockwise rotation of said implant into said placement site.

8. He implant of claim 4 wherein said first and second sets are spaced apart from one another on said implant's external surface by a distance of at least a quarter of said implant's external diameter.

9. The implant of claim 4 wherein at least some of the cutting grooves are arrayed spirally, with adjacent grooves spaced at least 180 degrees from one another.

\* \* \* \* \*